United States Patent
Resch et al.

(10) Patent No.: US 8,078,472 B2
(45) Date of Patent: Dec. 13, 2011

(54) VOICE-ACTIVATED REMOTE CONTROL SERVICE

(75) Inventors: Keith Resch, San Diego, CA (US); Aran London Sadja, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 901 days.

(21) Appl. No.: 12/150,128

(22) Filed: Apr. 25, 2008

(65) Prior Publication Data

US 2009/0271203 A1    Oct. 29, 2009

(51) Int. Cl.
*G10L 15/22* (2006.01)
(52) U.S. Cl. ...................................................... 704/275
(58) Field of Classification Search .................. None
See application file for complete search history.

(56) References Cited

U.S. PATENT DOCUMENTS

| | | | |
|---|---|---|---|
| 6,584,439 B1 * | 6/2003 | Geilhufe et al. | 704/270 |
| 6,912,274 B2 * | 6/2005 | Hitzeman et al. | 379/88.17 |
| 6,988,070 B2 | 1/2006 | Kawasaki et al. | |
| 7,143,147 B1 | 11/2006 | Hickman et al. | |
| 7,177,634 B2 * | 2/2007 | Wang et al. | 455/420 |
| 7,283,808 B2 | 10/2007 | Castell et al. | |
| 7,464,035 B2 * | 12/2008 | Funk et al. | 704/275 |
| 7,693,720 B2 * | 4/2010 | Kennewick et al. | 704/275 |
| 2004/0249641 A1 * | 12/2004 | Kwak | 704/275 |
| 2009/0167524 A1 * | 7/2009 | Chesnutt et al. | 340/539.19 |
| 2009/0168974 A1 * | 7/2009 | Mc Cormick | 379/45 |

OTHER PUBLICATIONS

"Reduced Energy Consumption and Improved Accuracy for Distributed Speech Recognition in Wireless Environments," Brian Delaney, School of Electrical and Computer Engineering, Georgia Institute of Technology, Sep. 2004.
"Multimodal Environmental Control System for Elderly and Disabled People," Valles et al., 18th Annual International Conference of the IEEE Engineering in Medicine and Biology Society, Amsterdam, 1996.

* cited by examiner

*Primary Examiner* — Talivaldis Ivars Smits
(74) *Attorney, Agent, or Firm* — Miller Patent Services; Jerry A. Miller

(57) ABSTRACT

A method of remotely controlling operation of a controlled device involves receiving a telephone call from an owner via a telephone network; authenticating the telephone call to establish that the owner is authorized to control the controlled device; interpreting a voice command from the owner that issues instructions to the controlled device based on a list of available commands stored in a database along with an Internet Protocol address or URL registry that associates the controlled device with the owner; identifying the controlled device based upon the authentication and identification by the owner of the controlled device; converting the voice command to one or more data packets capable of interpretation by the controlled device to execute the command; and delivering the one or more data packets to the controlled device via the Internet.

16 Claims, 4 Drawing Sheets

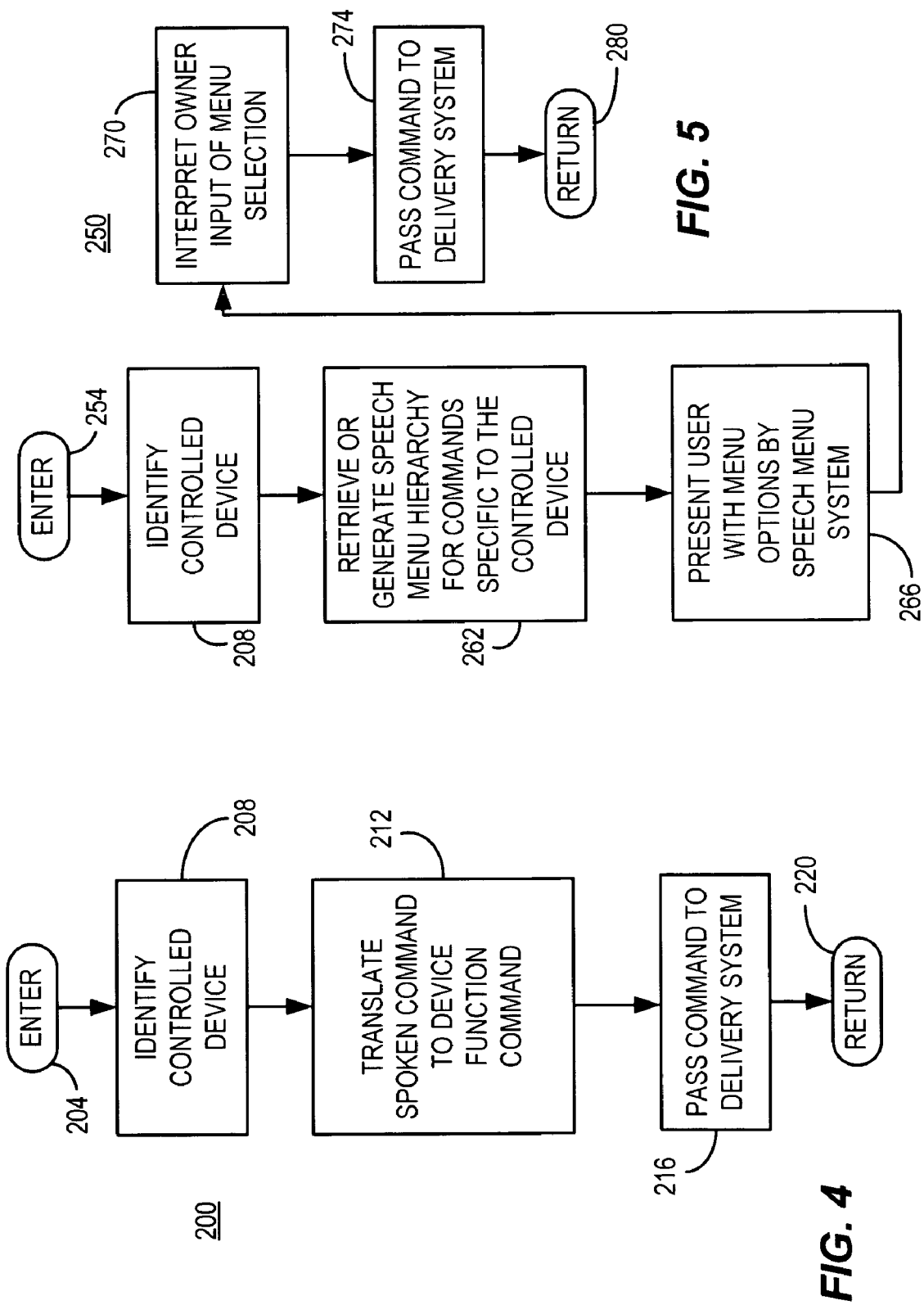

VOICE-ACTIVATED REMOTE CONTROL SERVICE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Remote control of certain home appliances via the Internet can be provided using a web administration panel which is hosted on the device that is to be controlled. However, this console is generally only accessible when the consumer has Internet access, which is commonly when they are at work or at home.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 4 is an example flow chart of a speech command recognition function implementing owner commands in a manner consistent with certain embodiments of the invention.

FIG. 5 is an example flow chart of a speech menu function for implementing owner commands in a manner consistent with certain embodiments of the invention.

DETAILED DESCRIPTION

Figure 1:
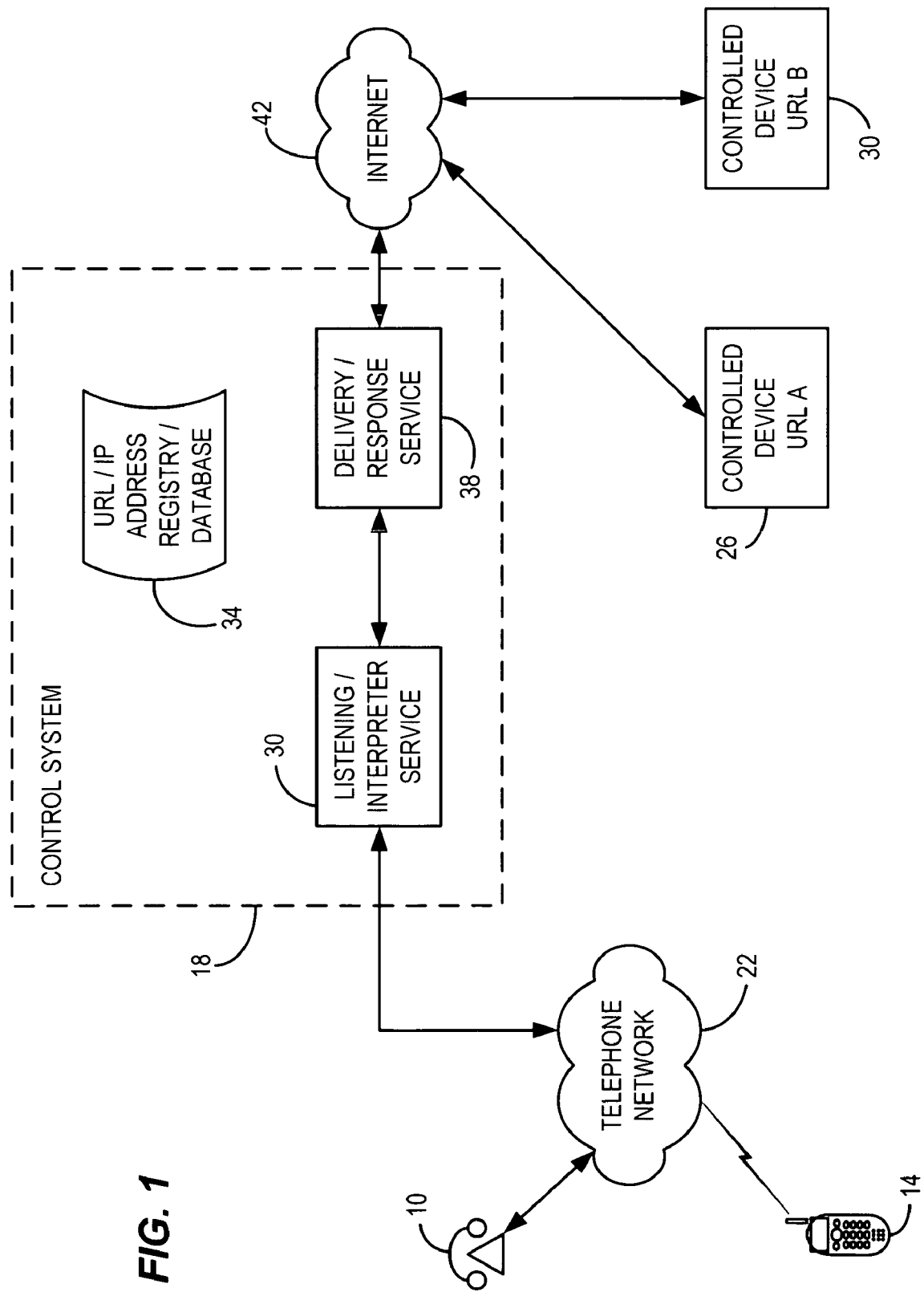
FIG. 1 is a block diagram of an exemplary system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "owner" as used herein is intended to be interpreted as an actual owner of a "controlled device" or a person who has authorization to control the controlled device. A "controlled device" is a device that is capable of having any aspect of its operation controlled by the owner using the mechanisms described herein. This term can, prior to actual execution of control commands be interpreted to mean "a device to be controlled". Each controlled device can be are registered for control by one or more owners.

The terms "telephone call" and "telephone network" are to be interpreted to encompass any network or combination of networks capable of delivery of a voice telephone call. Such networks include VOIP (Voice Over Internet Protocol) networks, conventional POTS (Plain Old Telephone System) network, private networks, cellular or other wireless networks, etc. and any combination thereof.

As previously noted, remote control of certain home appliances via the Internet can be provided using a web administration panel which is hosted on the device that is to be controlled. However, this console is generally only accessible when the consumer has Internet access, which is commonly when they are at work or at home. On the other hand, most consumers have regular access to a telephone, especially with the prevalence of cellular telephones, which increases the convenience of these Internet connected devices if controlled via telephone.

As more devices are connected to the Internet and gain the ability to be controlled remotely, consumers may wish to have quick and reliable access to their devices from any location. A service which can convert voice commands into the appropriate commands and communicate them to the device will provide a more accessible interface for these devices. This would allow customers the flexibility to control their device anytime a telephone is available.

In accordance with certain embodiments consistent with the present invention, a control system is provided which allows remote control of electronic devices via telephone (including wireless and cellular telephones), VOIP or similar service. This system uses a listening service which answers incoming phone calls and recognizes voice commands. An interpreter service converts the voice the commands into data packets which the target controlled device (e.g., an electronic device) can understand, and a delivery service sends the converted data directly to controlled device. Customers of this service (device owners) register their devices and their network location (e.g., IP address or URL) with the control system in order for the service to connect to and control the devices remotely.

A reverse notification arrangement can also be provided as a part of the system that automatically notifies the customer via telephone when a controlled device such as a home appliance is put to use during a specified trigger period, this could warn the customer of intruders in their home, or unauthorized access to certain devices or any other sort of alarm condition. The service in this case would receive a notification alarm from the device, convert that data into speech so that it is readily understandable to the customer, and call the customer to deliver that voice message.

In accord with certain embodiments, the control system utilizes a database of controlled devices and their supported communication protocol, owner and an address that can be accessed over the Internet. The system also has one or more telephone numbers which could be called from anywhere. These telephone numbers attach to a voice recognition system which allows owners to authenticate themselves and provide voice instructions for the device they wish to control. The system then transmits that information to the registered controlled devices using an appropriate control signal sent via the Internet. In certain embodiments, the system could then confirm that the device received the command or inform the user that a failure occurred, this notification could happen in the form of a call-back to the customer's phone or in real time while the customer waits. Customers signing up for the service could, via a web page or a voice activated telephone system, choose their device from the list of supported devices and add that device to their account along with the network address of that device. In certain embodiments, customers can name their device for quick access when calling in. Once configured, when a customer wants to control their device, they simply call the telephone number of the service and tell a voice recognition system which device they would like to manage. The voice recognition system then walks the owner through the appropriate commands for the device and allows the customer to speak their choice of commands. When the command is understood and complete, the system can transmit that command to the device and provide the owner with a confirmation. This is a complete departure from the current web based control for devices like DVR boxes which sometimes have remote control capabilities.

Hence, by way of example, a customer of the service (also referred to as the user or owner herein without loss of generality) who believes they left their oven on could call the service, confirm that the oven is on, and have it turned off. Conversely, a customer on the way home could call from their cellular telephone and have the oven turned on and pre-heated so that it is warmed up when they arrive and are ready to cook dinner. Other use cases can involve home heating/air-conditioning systems, setting a DVR to record a television program, to turn off an alarm clock while the owner is on vacation, lighting control, etc.

Turning now to FIG. 1, an exemplary embodiment of a system as generally described above is depicted in block diagram form. In this embodiment, an owner can utilize a conventional wired or wireless telephone 10 or cellular telephone 14 to call a control system service 18 via a conventional telephone call mechanism using any available telephone network 22. Speech commands are then used to control the function of a controlled device such as controlled devices A or B shown as 26 and 30 respectively, each having their own IP address or URL respectively so that the control system service 18 can individually address each controlled device. In certain embodiments, the controlled device could even be a legacy controller having its own IP address or URL which controls other devices (e.g., via infrared commands or the like).

By use of a conventional voice telephone call, the user is authenticated by the control system service 18 after which a listening and interpreting function is carried out at block 30. The listening and interpreting service function 30 interprets the speech commands from the owner and converts the commands to control packets, with the assistance of a database 34 serving as an IP address/URL registry that associates controlled devices with their respective owners as well as providing an index of available commands. The control commands are then packetized at a delivery/response service 38 to place them in a form suitable for transmission over the Internet 42. In this manner, a control signal can be provided to a controlled device such as controlled devices 26 and 30 using voice commands from any location where telephone communication is possible.

In an analogous manner, the controlled devices such as 26 and 30 can provide confirmation (acknowledgement) signals using the reverse operation wherein packets from the controlled device are converted to speech by the control system service 18 and speech signals can thus be delivered to the owner. By way of example, an owner could issue commands to an Internet connected appliance such as an oven by issuing voice commands such as "oven on 350 degrees". This command can be converted to control messages that are delivered by TCP/IP or any other suitable protocol to the oven over the Internet, with the oven then replying, either in the same communication session or by a separate call to the owner. In this case the oven communications (referred to herein as alerts or responses) would be delivered to the control system service 18 in digital form which is then converted to speech messages such as "oven commands acknowledged" or "oven on, temperature set to 350 degrees" or the like. Those skilled in the art will appreciate that many variations in the exact nature of the voice messages and command interpretation are possible after consideration of the present teachings.

Figure 2:
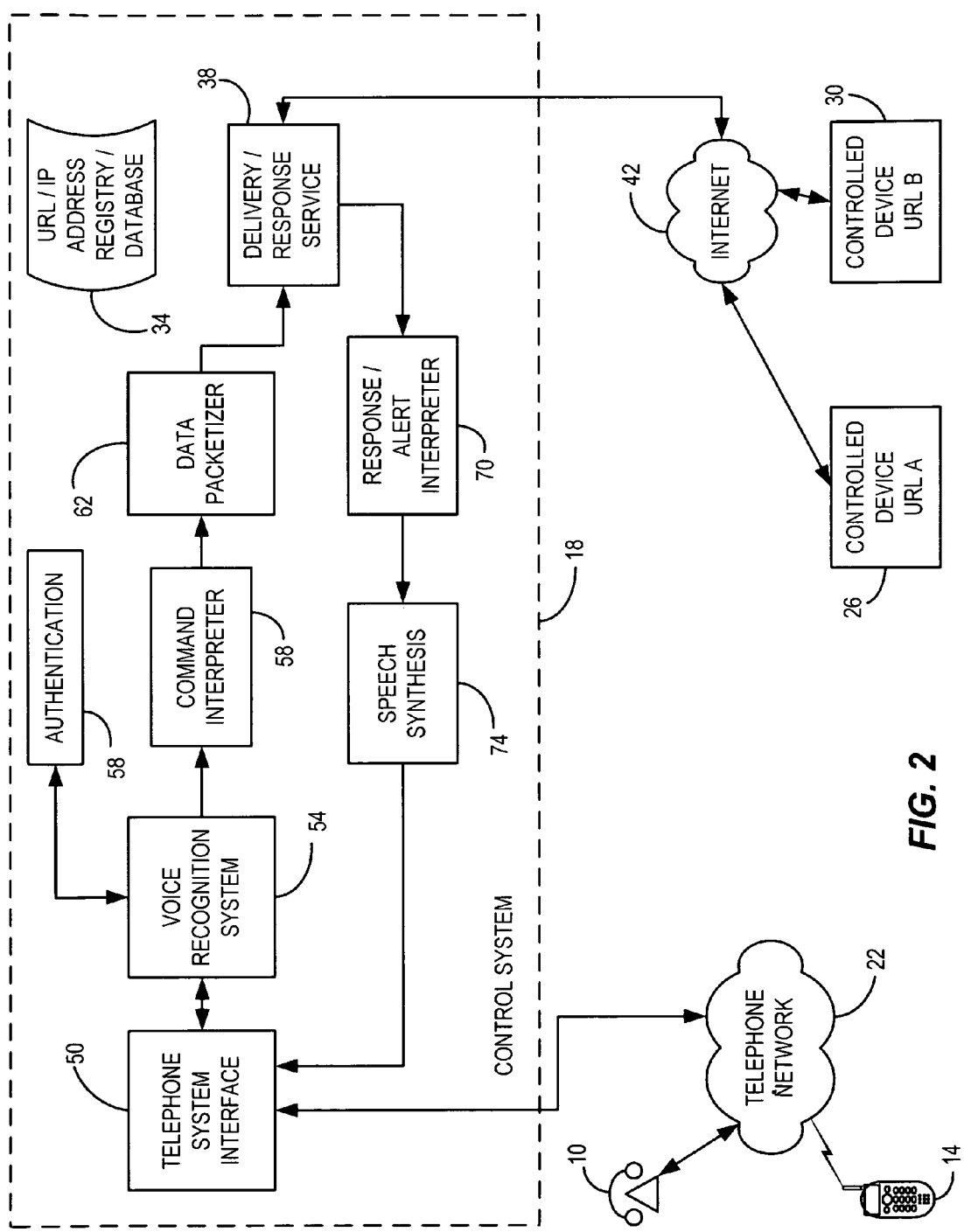
FIG. 2 is a more detailed block diagram of an exemplary system consistent with certain embodiments of the present invention.

Referring now to FIG. 2, an embodiment consistent with the present invention is depicted in which listening and interpreting service 30 is shown in greater detail. In this embodiment, as with the prior discussion, two-way communications with the controlled device is presumed, but one-way communication embodiments are also possible and their implementation will generally involve omission of acknowledgment paths and paths for communication from the controlled device to the owner. Such embodiments are contemplated hereby.

In the depicted embodiment, a telephone interface 50 provides a conventional interface to a telephone network 22 as shown. For communication from an owner to a controlled device, the speech commands are passed through the telephone interface 50 to a voice recognition system 54 which converts speech into machine understandable constructs. In order to progress to a point of being able to issue commands, it is desirable to authenticate the owner as an actual owner of the controlled device using authentication system 58. This can be carried out by any number of techniques including requiring a password to be spoken or entered via the telephone keypad. Data used for authentication can be contained in database 34. An illustrative database table (shown in conceptual form) representation of such a database is shown as TABLE 1. It will be understood that a relational database can devised in many ways to provide the functions depicted as will be described in greater detail.

TABLE 1

Owner Table

| Owner last name | | Smith | |
|---|---|---|---|
| Owner first name | | John | |
| Owner ID | | 12345 | |
| Owner Password | | Fido | |
| Owner telephone numbers | 800-555-1234 | 800-555-4321 | 800-555-0000 |
| Owned device ID | 123456 | 654321 | 999999 |
| Owned device address | 19200123495 | 19299929929 | 19222299988 |
| Owned device nickname | Oven | Garage door | VCR |

In one example, in the case of owner John Smith shown in TABLE 1, the owner is prompted by the voice recognition system 54 to identify himself by either owner ID or by owner name. This step might be bypassed (or the security enhanced) if the call is identified using caller ID technology to match one of the owners telephone numbers. The voice recognition system 54 can then prompt the user for his password (which may be a spoken word or phrase or a key entry. TABLE 1 can also provide for hints in case the password is forgotten as well as other data as is deemed useful for a particular embodiment. When the user passes the appropriate tests to assure authentication into the system, control commands can then be issued to any of the devices identified, in this example in TABLE 1, as being owned by the owner.

Commands to the controlled device can then be issued by speech by the owner which is recognized by voice recognition system 54 and passed along to the command interpreter 58. The command interpreter 58 then produces commands that are understandable by the controlled device which is being addressed (e.g., oven or garage door) and these commands are passed along to the packetizer 62 which packages the commands for delivery to the controlled device by the delivery service 38 using the Internet 42.

In the embodiment depicted, a response/alert interpreter 70 may receive data from any of the controlled devices for delivery back to the owner. One example would involve a simple acknowledgement of commands received, while others might represent alerts as to a problem situation (e.g., a garage door left open or opened at an unexpected time). In such events, the message from the controlled device is delivered to the control system 18 via the Internet 42, and that message is interpreted at interpreter 70, which converts the message to a format that can be converted to speech by speech synthesizer 74 using any number of techniques including lookup of speech messages on a stored lookup table or generation of a speech interpretation of the message after looking up a meaning for the message. In any case, a call is initiated if a voice session is not already in progress, to contact the owner via the telephone interface 50. If a session is already in progress, the message is merely passed along, whereas, if a session is not in progress, an ordered hierarchical attempt to contact the user using known telephone numbers from TABLE 1 (or to a last number called from) is initiated. Other processes could also be carried out without departing from embodiments consistent with the present invention.

Figure 3:
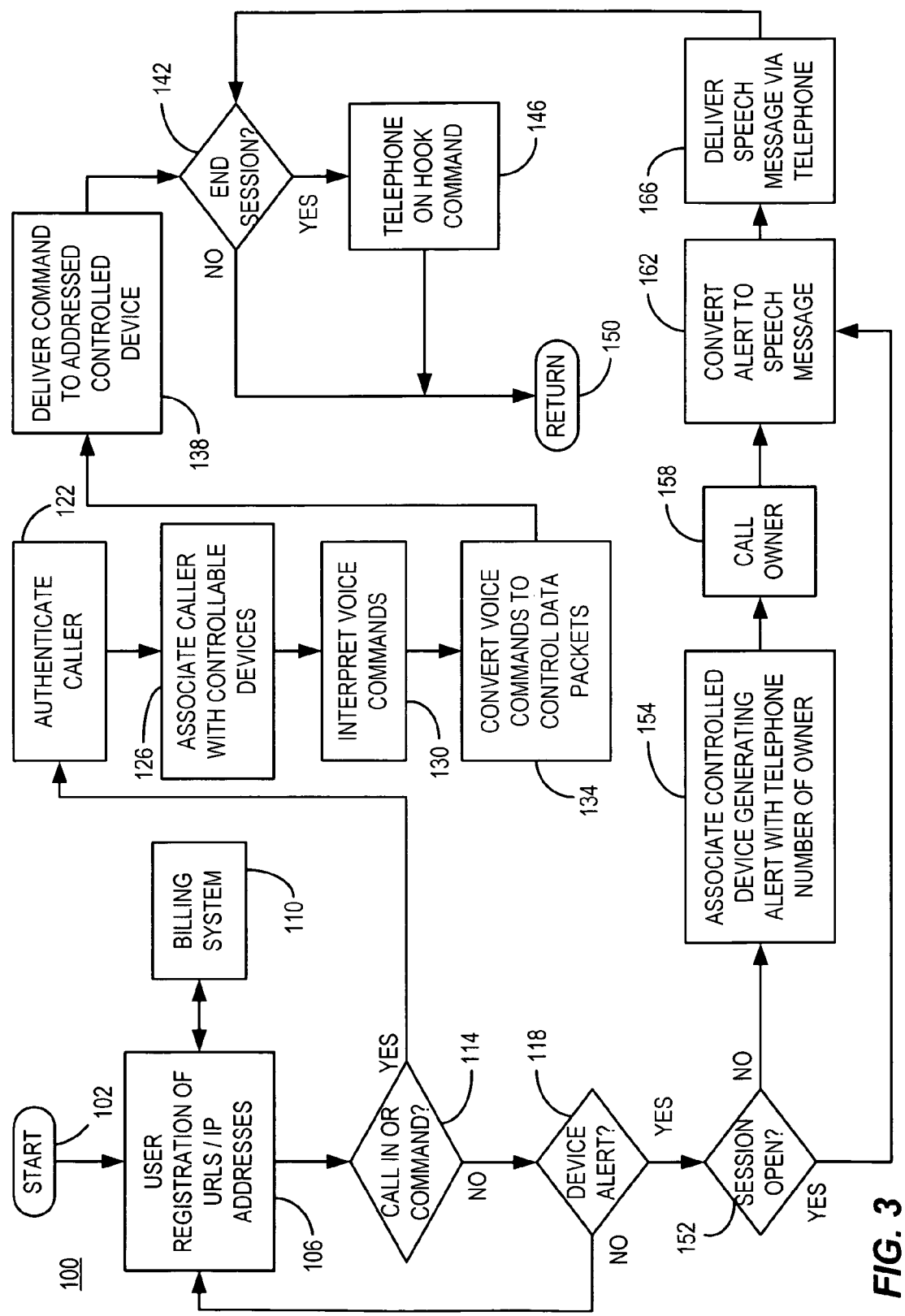
FIG. 3 is an example flow chart of operation of a system consistent with certain embodiments of the present invention.

FIG. 3 depicts one process 100 for operation of an exemplary embodiment consistent with the present invention starting at 102. In this embodiment, at 106 an owner can carry out a registration process either to initiate a subscription to the service, to add or change a device or otherwise update the database associated with the owner's account. This interaction, as well as other actions that can be carried out according to embodiments of the invention, may be coupled to a billing system at 110 in order to appropriately charge a user for service in any suitable manner (e.g., a monthly fee, or charges by usage, etc.).

At 114, the process determines if an owner is calling in to the service, and if not, the process determines at 118 if an alert or other message is to be delivered to the owner. If not, the process continues to check for owner updates, owner calls or alerts until one occurs. If an owner call-in takes place at 114, an authentication process is carried out at 122. Such authentication process need not be the specific process previously described. After or during proper authentication, the owner calling in is associated with one or more controlled devices at 126. The owner can then proceed to issue voice commands which are interpreted at 130 and converted to suitable control data packets at 134. The control data packets are then delivered to the addressed controlled device at 138. If this command ends the current command session, at 142, then the telephone network interface goes on-hook (hangs up) after a suitable call termination protocol with the owner (e.g., indicating by speech message that the command is being delivered). The process then returns at 144 to await the next call-in, alert or user profile change.

In one example of the garage door as depicted in TABLE 1, TABLE 2 shows various commands that could be implemented. Thus, if a user issued the voice command "open door", a code "00000000" would be sent to device ID 19299929929 via an Internet delivered packet or packets.

TABLE 2

Device command

| Device name | Garage door | | | |
|---|---|---|---|---|
| Device ID | 654321 | | | |
| Device address | 19299929929 | | | |
| Commands | Open door | Close door | Lock door | Unlock door |
| Command code | 00000000 | 00000001 | 00000010 | 00000011 |

If the session has not ended at 142, for example in the case of awaiting an acknowledgement from the controlled device, control returns to the loop including 118 where the message or acknowledgement or alert from the controlled device is detected at 118 and control passes to 152 where the system determines if the session is open. If not, the message from the controlled device is associated with an owner telephone number at 154 and the owner is called at 158. Control then passes to 162. In the event the session is open at 152, control bypasses 154 and 158 directly to 162 where the alert or other message from the controlled device is converted to a speech message by synthesis or lookup, for example. This speech message is then delivered by telephone at 166 and control passes to 142 to determine if the session is to be ended (by any suitable means—owner control, default decisions, completion of a two way exchange, etc.).

Referring now to FIG. 4, an example flow chart of a speech command recognition function implementing owner commands in a manner consistent with certain embodiments of the invention is depicted as 200 starting at 204, and can form a part of the process 100 as generally described previously. In this embodiment the system identifies the controlled device which the owner wishes to control by interpreting voice commands (e.g., "oven" or "garage door") at 208 using any suitable speech recognition process. At 212, a spoken command is translated into a device function command (e.g., "close door" is translated to the corresponding digital code). Once translated, at 216, the command is passed to the delivery system and sent to the target controlled device, and the process returns at 220 to await a response or the next command.

FIG. 5 is an example flow chart of a process 250 for implementing owner commands in a manner consistent with certain embodiments of the invention, which utilizes speech recognition in a speech driven menu system, starting at 250. In this embodiment the system identifies the controlled device which the owner wishes to control by interpreting voice commands (e.g., "oven" or "garage door") at 208 as in process 200. Note that due to a limited vocabulary, the speech recognition is readily implemented. At 262, the process retrieves or generates a speech menu hierarchy for commands specific to the controlled device and presents the menu options to the user at 266. For example, if the controlled device is an oven, a menu hierarchy can be devised which asks a series of questions to the owner such as "say 'on' if you wish to turn the oven on; say 'off' if you wish to turn the oven off". Assume the owner wishes to turn on the oven at 375 degrees in at 5:30 PM, the owner would say "oven" This can be followed with "say 'broiler' if you want to turn on the broiler; say 'oven' if you wish to turn on the oven burner". The owner would then say "oven". The menu system would reply with "what temperature?" The owner would then say "375". The menu system would then ask "what time would you like to turn on the oven to 375 degrees?" The owner can then respond with "today, 5:30 PM". As these commands are received and interpreted, they may be repeated for verification purposes by the speech recognition system in certain embodiments.

During or after such an exchange, the system can interpret the owner's speech inputs at 270 and convert such inputs to binary commands that can be understood by the controlled device, in this example and oven. At 274, the commands are passed to the delivery system and sent to the target controlled device, and the process returns at 280 to await a response or the next command. The reader will appreciate that many variations of the methods described as 100, 200 and 250 above can be devised and integrated without departing from embodiments consistent with the present invention upon consideration of the present teachings, which are not intended to be limiting.

A method of remotely controlling operation of a controlled device involves receiving a telephone call from an owner via a telephone network; authenticating the telephone call to establish that the owner is authorized to control the controlled device; interpreting a voice command from the owner that issues instructions to the controlled device; identifying the controlled device based upon the authentication and identification by the owner of the controlled device; converting the voice command to one or more data packets capable of interpretation by the controlled device to execute the command; and delivering the one or more data packets to the controlled device via the Internet.

In certain embodiments, the interpreting comprises interpreting responses to a speech synthesized menu query. In certain embodiments, the controlled device is registered to an owner and is associated with the owner using a database. In certain embodiments, the process further involves confirming receipt of the data packets and sending a confirming speech message to the owner. In certain embodiments, the confirming is carried out during the same call session initiated when the owner placed the telephone call. In certain embodiments, the confirming is carried out by placing a new telephone call to the owner. In certain embodiments, the owner selects the controlled device from a list of supported devices, and adds that controlled device to an account along with a network address of that device. In certain embodiments, the controlled device is identified by an owner specified spoken name. In certain embodiments, the controlled device comprises an addressable legacy controller which controls another device. In certain embodiments, a computer readable storage medium stores instructions which, when executed on one or more programmed processors, carry out any of these processes.

In certain embodiments, a remote control system for remotely controlling operation of a controlled device has a telephone system interface that receives a telephone call from an owner via a telephone network. A voice recognition system recognizes speech and converts the speech to digital signals An authentication system establishes that the owner is authorized to control the controlled device. A command interpreter interprets a voice command from the owner to identify a controlled device and to provide a command that controls operation of the controlled device. The controlled device is identified based upon the authentication and identification by the owner of the controlled device. A data packetizer converts the voice command to one or more data packets capable of interpretation by the controlled device to execute the command. A delivery system delivers the one or more data packets to the controlled device via the Internet.

In certain embodiments, the interpreting comprises interpreting responses to a speech synthesized menu query. In certain embodiments, the system further has database, wherein the controlled device is registered to an owner and is associated with the owner using the database. In certain embodiments, the delivery system further confirms receipt of the data packets, and wherein the system sends a confirming speech message to the owner. In certain embodiments, the speech message is generated by a speech synthesizer. In certain embodiments, the confirming is carried out during the same call session initiated when the owner placed the telephone call. In certain embodiments, the confirming is carried out by placing a new telephone call to the owner. In certain embodiments, the owner selects the controlled device from a list of supported devices, and adds that controlled device to an account along with a network address of that device. In certain embodiments, the controlled device is identified by an owner specified spoken name. In certain embodiments, the controlled device comprises an addressable legacy controller which controls another device.

In certain other embodiments, a remote control system for remotely controlling operation of a controlled device has a database, wherein the controlled device is registered to an owner and is associated with the owner using the database, and wherein the owner selects the controlled device from a list of supported devices, and adds that controlled device to an account along with a network address of that device, and wherein the owner and the controlled device are stored in the database. A telephone system interface receives a telephone call from an owner via a telephone network. A voice recognition system recognizes speech and converts the speech to digital signals. An authentication system establishes that the owner is authorized to control the controlled device. A command interpreter interprets a voice command from the owner to identify a controlled device and to provide a command that controls operation of the controlled device, wherein the interpreting comprises interpreting responses to a speech synthesized menu query. The controlled device is identified based upon the authentication and identification by the owner of the controlled device, and wherein the controlled device is identified by an owner specified spoken name. A data packetizer converts the voice command to one or more data packets capable of interpretation by the controlled device to execute the command. A delivery system delivers the one or more data packets to the controlled device via the Internet. The delivery system further confirms receipt of the data packets, and wherein the system sends a confirming speech message to the owner, and wherein the speech message is generated by a speech synthesizer.

In certain embodiments, the confirming is carried out during the same call session initiated when the owner placed the telephone call. In certain embodiments, the confirming is carried out by placing a new telephone call to the owner. In certain embodiments, the controlled device comprises an addressable legacy controller which controls another device.

As noted above, a search is performed using a system which allows remote control of electronic devices via telephone, cellular, VOIP or similar service. This system has a listening service which answers incoming phone calls and recognizes voice commands. An interpreter service converts the voice the commands into data packets which the target electronic device can understand, and a delivery service sends the converted data directly to consumer's device. A user registers their controlled devices and their network location (IP or URL) with the service in order for the service to connect to and control the devices remotely.

Those skilled in the art will recognize, upon consideration of the above teachings, that certain of the above exemplary embodiments are based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Similarly, while certain embodiments herein were described in conjunction with specific circuitry that carries out the functions described, other embodiments are contemplated in which the circuit functions are carried out using equivalent programmed processor based implementations. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of remotely controlling operation of a controlled device, comprising:
   receiving a telephone call from an owner via a telephone network;
   authenticating the telephone call to establish that the owner is authorized to control the controlled device;
   interpreting a voice command from the owner that issues instructions to the controlled device by reference to a list of available commands for the controlled device;
   where the list of available commands is stored in a database along with an Internet Protocol address or URL registry that associates the controlled device with the owner;
   identifying the controlled device based upon the authentication and identification by the owner of the controlled device;
   converting the voice command to one or more data packets capable of interpretation by the controlled device to execute the command;
   delivering the one or more data packets to the controlled device via the Internet;
   confirming receipt of the data packets and sending a confirming speech message to the owner confirming that the controlled device has executed the command; and
   where the confirming is carried out by placing a new telephone call to the owner.

2. The method according to claim 1, where the interpreting comprises interpreting responses to a speech synthesized menu query.

3. The method according to claim 1, where the controlled device is registered to an owner and is associated with the owner using a database.

4. The method according to claim 1, where the owner selects the controlled device from a list of supported devices, and adds that controlled device to an account along with a network address of that device.

5. The method according to claim 1, where the controlled device is identified by an owner specified spoken name.

6. The method according to claim 1, where the controlled device comprises an addressable legacy controller which controls another device.

7. A computer readable storage medium storing instructions which, when executed on one or more programmed processors, carry out a process according to claim 1.

8. A remote control system for remotely controlling operation of a controlled device, comprising:
   a telephone system interface that receives a telephone call from an owner via a telephone network;
   a voice recognition system that recognizes speech and converts the speech to digital signals;
   an authentication system that establishes that the owner is authorized to control the controlled device;
   a command interpreter that interprets a voice command from the owner by reference to a list of available commands for the controlled device to identify a controlled device and to provide a command that controls operation of the controlled device;
   where the list of available commands is stored in a database along with an Internet Protocol address or URL registry that associates the controlled device with the owner;
   where the controlled device is identified based upon the authentication and identification by the owner of the controlled device;

a data packetizer that converts the voice command to one or more data packets capable of interpretation by the controlled device to execute the command;

a delivery system that delivers the one or more data packets to the controlled device via the Internet;

where the delivery system further confirms receipt of the data packets, and where the system sends a confirming speech message to the owner; and where the confirming is carried out by placing a new telephone call to the owner.

9. The system according to claim 8, where the interpreting comprises interpreting responses to a speech synthesized menu query.

10. The system according to claim 8, further comprising a database, and where the controlled device is registered to an owner and is associated with the owner using the database.

11. The system according to claim 8, where the speech message is generated by a speech synthesizer.

12. The system according to claim 8, where the owner selects the controlled device from a list of supported devices, and adds that controlled device to an account along with a network address of that device.

13. The system according to claim 8, where the controlled device is identified by an owner specified spoken name.

14. The system according to claim 8, where the controlled device comprises an addressable legacy controller which controls another device.

15. A remote control system for remotely controlling operation of a controlled device, comprising:

a database, where the controlled device is registered to an owner and is associated with the owner using the database, where the owner selects the controlled device from a list of supported devices, and adds that controlled device to an account along with a network address of that device, and where information identifying the owner and the controlled device are stored in the database;

a telephone system interface that receives a telephone call from an owner via a telephone network;

a voice recognition system that recognizes speech and converts the speech to digital signals;

an authentication system that establishes that the owner is authorized to control the controlled device;

a command interpreter that interprets a voice command from the owner by reference to a list of available commands for the controlled device to identify a controlled device and to provide a command that controls operation of the controlled device, where the interpreting comprises interpreting responses to a speech synthesized menu query;

where the list of available commands is stored in the database along with an Internet Protocol address or URL registry that associates the controlled device with the owner;

where the controlled device is identified based upon the authentication and identification by the owner of the controlled device, and where the controlled device is identified by an owner specified spoken name;

a data packetizer that converts the voice command to one or more data packets capable of interpretation by the controlled device to execute the command;

a delivery system that delivers the one or more data packets to the controlled device via the Internet;

where the delivery system further confirms receipt of the data packets, and where the system sends a confirming speech message to the owner, and where the speech message is generated by a speech synthesizer; and where the confirming is carried out by placing a new telephone call to the owner.

16. The system according to claim 15, where the controlled device comprises an addressable legacy controller which controls another device.

* * * * *